(12) United States Patent
Ichihara et al.

(10) Patent No.: US 6,424,124 B2
(45) Date of Patent: Jul. 23, 2002

(54) SYSTEM FOR PROVIDING CHARGE BETWEEN COMMUNICATION DEVICES

(75) Inventors: Masaki Ichihara; Kozo Maemura, both of Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/749,187

(22) Filed: Dec. 27, 2000

(30) Foreign Application Priority Data

Dec. 27, 1999 (JP) .......................................... 11-371727

(51) Int. Cl.[7] .............................................. H01M 10/46
(52) U.S. Cl. ...................................................... 320/149
(58) Field of Search ................................ 320/106, 110, 320/108, 114, 115, 132, 149

(56) References Cited

U.S. PATENT DOCUMENTS

| 5,455,466 A | 10/1995 | Parks et al. |
| 5,870,615 A | 2/1999 | Bar-On et al |
| 5,907,815 A | 5/1999 | Grimm et al. |

FOREIGN PATENT DOCUMENTS

| JP | 8-237345 | 9/1996 |
| JP | 8-340389 | 12/1996 |
| JP | 10-173799 | 6/1998 |
| JP | 10-189369 | 7/1998 |
| JP | 11-103331 | 4/1999 |

*Primary Examiner*—Edward H. Tso
(74) *Attorney, Agent, or Firm*—Scully, Scott, Murphy & Presser (57) ABSTRACT

A charging system for portable equipment is provided which may be used in a system including an information terminal and portable equipment connected to the information terminal. The charging system includes a power supply output device provided with the information terminal and a first battery control device provided with the portable equipment. The power supply output device is capable of supplying electric power, which is supplied to the information terminal, to the portable equipment. The first battery control device receives electric power supplied from the power supply output device and performs a charging operation for a battery of the portable equipment.

20 Claims, 7 Drawing Sheets

SYSTEM FOR PROVIDING CHARGE BETWEEN COMMUNICATION DEVICES

BACKGROUND OF THE INVENTION

1. Field of the invention

The present invention relates to a charging system. More specifically, the present invention relates to a charging system for portable equipment connected to a terminal device such as a personal computer.

2. Description of related art

Recently, the use of mobile phones has rapidly increased and it is said that one in every three Japanese people has a mobile phone. It seems merely a matter of time that the day will come when almost all people in the country, except infants, will possess a mobile phone of some kind.

On the other hand, use of a personal computer (PC) has also rapidly increased and many businessmen, in general, use a personal computer in their work places. Among them, the number of people who possess both a note book-type portable PC and a mobile phone and who use them in places where there is no external power supply has significantly increased.

The first thing that must be accounted for when a note book-type portable PC or a mobile phone is expected to be used outside is how to charge the batteries. Especially in a situation where the note book-type portable PC and the mobile phone are expected to be used outside for a long time, it is necessary to carry charging devices specially designed for the PC and the mobile phone, respectively.

Figure 7:
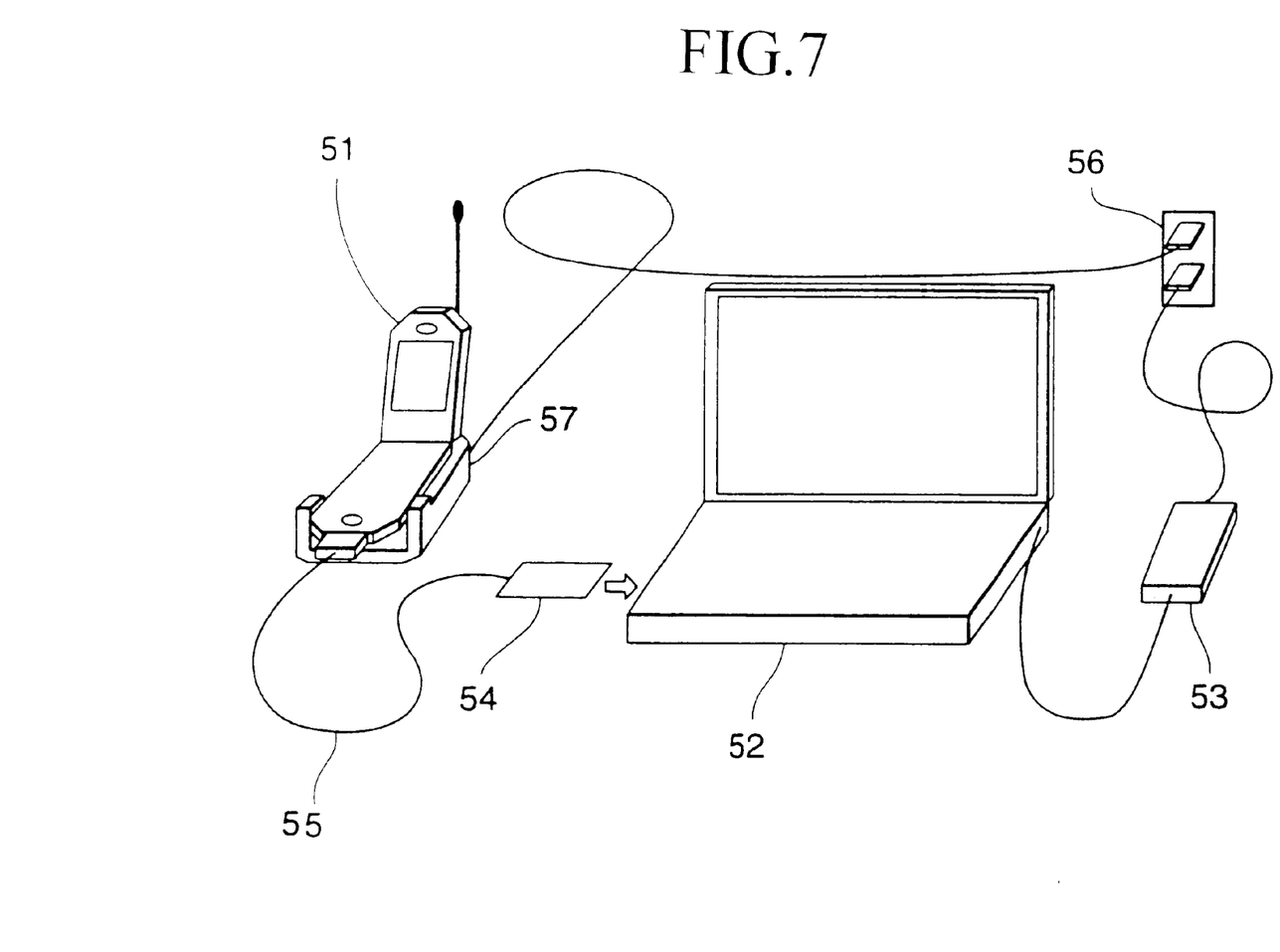
FIG. 7 is a diagram showing a conventional manner of connecting a computer with a mobile phone.

FIG. 7 is a diagram showing a conventional manner of connecting a computer and a mobile phone during operating conditions. A mobile phone 51 is connected to a computer 52 via a cable 55 and an interface card 54, to carry out a sending/receiving operation of data. Electric power for the operation of the computer 52 is supplied from an outlet 56 via a DC adapter 53. In order to change the mobile phone 51, it is necessary to connect the mobile phone 51 to the outlet 56 via a charging device 57 which is specially designed for the mobile phone 51.

Also, in many occasions, it is desired to connect the computer 52 to the Internet using the mobile phone 51 when there is no outlet 56, such as in a situation when working outside. In such a circumstance, however, it often happens that a connection to the Internet cannot be made due to the exhaustion of the batteries contained in the mobile phone 51 even though the remaining charge of the batteries in the computer 52 is sufficient.

In the case described above, if a charging device especially designed for charging the mobile phone S1 is merely mounted in the computer 52 to carry out a charging process for the mobile phone 51, the circuit thereof will overlap with the charging circuit for the computer 52, and the size of the computer 52 as well as the cost necessary for the production thereof will increase.

Accordingly, a charging system has been awaited, which is capable of charging the batteries of a computer and a mobile phone in a uniform manner, and also capable of charging the mobile phone when the computer does not require electric power from an external power supply, i.e., when the computer is powered by internal batteries and the remaining charge of the batteries is sufficient.

SUMMARY OF THE INVENTION

It is therefore an object of the present invention to provide a charging system for portable equipment which does not require an increase in the size and cost of a computer and which is capable of charging portable equipment by using electric power supplied from the computer.

Accordingly, the present invention provides a charging system for portable equipment used in a system including an information terminal and portable equipment connected to the information terminal, the portable equipment being operated by using electric power supplied from a battery and data is transmitted between the information terminal and the portable equipment via a communication unit, including: a power supply output device provided with the information terminal, the power supply output device being capable of supplying electric power, which is supplied to the information terminal, to the portable equipment; and a first battery control device provided with the portable equipment, the first battery control device receives electric power supplied from the power supply output device and performs a charging operation for the battery of the portable equipment.

The present invention also provides a charging system for portable equipment, wherein the first battery control device detects a remaining charge of the battery of the portable equipment; and the power supply output device supplies electric power to the portable equipment when the remaining charge of the battery of the portable equipment detected by the first battery control device is equal to or less than a first allowable value.

The present invention also provides a charging system for portable equipment, further including: an identification device provided with the information terminal, the identification device identifies whether the information terminal is being operated in battery mode, wherein the power supply output device supplies electric power to the portable equipment when the identification device identifies that the information terminal is not being operated in battery mode.

The present invention also provides a charging system for portable equipment, further including: a second battery control device provided with the information terminal, the second battery control device detects the remaining charge of a second battery which supplies electric power to the information terminal, wherein the power supply output device supplies electric power to the portable equipment when the identification device identifies that the information terminal is not being operated in battery mode or the remaining charge of the second battery detected by the second battery control device is greater than a second allowable value, and the power supply output device stops supplying electric power to the portable equipment when the identification device identifies that the information terminal is being operated in battery mode and the remaining charge of the second battery detected by the second battery control device is equal to or less than a second allowable value.

The present invention also provides a charging system for portable equipment, further including: a display unit which displays a reduction in the remaining charge of the second battery when the remaining charge of the second battery detected by the second battery control device is equal to or less than the second allowable value and no electric power is being supplied from the information terminal.

The present invention also provides a charging system for portable equipment, further including: an alarm unit which produces an alarm sound when the remaining charge of the second battery detected by the second battery control device is equal to or less than the second allowable value and no electric power is being supplied from the information terminal.

The present invention also provides a charging system for portable equipment, further including: a power transmission coil provided with the information terminal, electric power being supplied to the power transmission coil from the information terminal; and a power receiving coil provided with the portable equipment, the power receiving coil is electromagnetically coupled with the power transmission coil and supplies an induced voltage to the portable equipment, wherein the communication unit carries out data transmission between the information terminal and the portable equipment by means of radio communication or optical communication.

According to the present invention, since the electric power to be supplied to an information terminal may be supplied to portable equipment, a charging operation for the portable equipment may be performed without using a separate charging device which is specially designed for the portable equipment. Thus, the charging operation may be carried out in a significantly more convenient manner.

Also, according to the present invention, the charging operation for the portable equipment is performed when the information terminal is operated in battery mode and the remaining charge of the battery is greater than an allowable value. That is, the charging operation for the portable equipment is not carried out when the remaining charge of the battery is equal to or less than the allowable value. In this manner, a situation where the battery of the information terminal runs out and becomes inoperative is prevented.

Moreover, according to the present invention, data is transmitted between the information terminal and the portable equipment by means of radio communication or optical communication, and electric power is transferred by the electromagnetic coupling of coils provided in both the information terminal and the portable equipment. Accordingly, use of a coupling cable which physically connects the portable equipment and the information terminal becomes unnecessary and portability of the present invention is further increased.

BRIEF DESCRIPTION OF THE DRAWINGS

Some of the features and advantages of the invention having been described, others will become apparent from the detailed description which follows, and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of a particular preferred embodiment, set out below to enable one to build and use one particular implementation of the invention, is not intended to limit the enumerated claims, but to serve as a particular example thereof.

Figure 1:
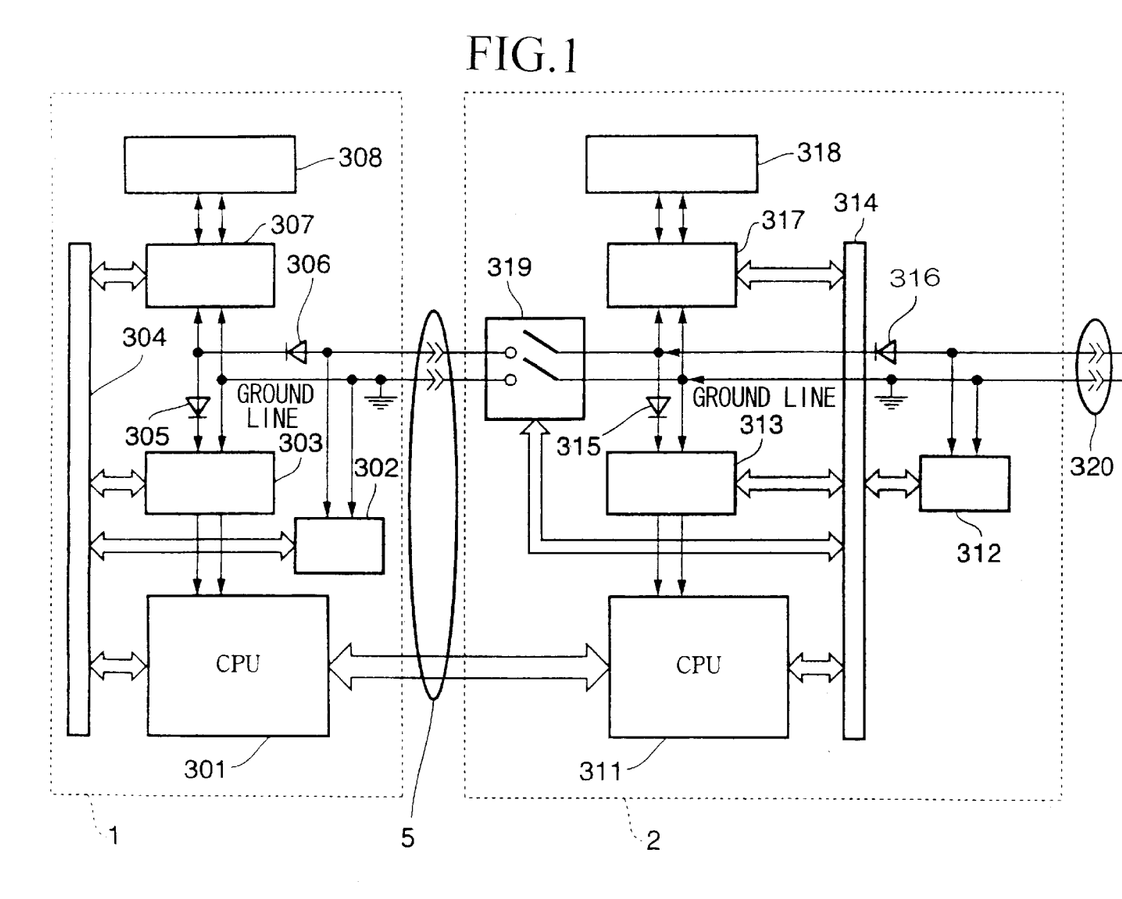
FIG. 1 is a schematic block diagram showing a structure of a charging system for portable equipment according to an embodiment of the present invention.

FIG. 1 is a schematic block diagram showing a structure of the charging system for portable equipment according to an embodiment of the present invention. In FIG. 1, a computer 2 is, for instance, a note book-type PC which may be carried around. A voltage sensor 312 measures the voltage supplied via a power supply terminal 320 and outputs the results to a central processing unit (CPU) 311 via a control signal bus 314. A diode 316 prevents the electric current from flowing to the power supply terminal 320 from a battery 318. When electric power is not supplied to the computer 2 via the power supply terminal 320, the input voltage of the voltage sensor 312 decreases to about 0 volts due to the internal resistance of the voltage sensor 312 and the action of the diode 316. On the other hand, when electric power is supplied to the computer 2, the voltage supplied externally via the power supply terminal 320 is detected by the voltage sensor 312.

A battery control circuit 317 charges the battery 318,based on a command from the CPU 311,by using power supplied externally via the power supply terminal 320. The battery control circuit 317 also detects the remaining charge of the battery 318 and outputs the result of the detection to the CPU 311. The remaining charge of the battery 318 may be determined based on the result of the detection of the terminal voltage of the battery 318. Also, the remaining charge of the battery 318 may be detected by the battery control circuit 317 which carries out an operation of multiplying a charging current by a discharging current of the battery 318. A voltage stabilizing circuit 313 stabilizes a power supplied to the CPU 311.

The CPU 311 compares the detection result, which is output from the voltage sensor 312,with a predetermined voltage value and, if the detection result is greater than the predetermined voltage value, sets the mode to external power supply mode so that the device is actuated by a power supplied from an external power supply via a DC adapter 3 (refer to FIG. 2) and the power supply terminal 320. If the detection result is less than the predetermined voltage value, the CPU 311 sets the mode to battery mode (battery actuation mode) so that the device is actuated by power supplied by the battery 318.

In battery mode, if the CPU 3 11 detects that the remaining charge of the battery 318 is less than a predetermined value or an allowable value set by a user, based on the detection result of the battery control circuit 317, the CPU 311 switches off a switch 319 and terminates the power being supplied to a mobile phone 1. On the other hand, if the CPU 311 detects, based on the detection result of the battery control circuit 317, that the remaining charge of the battery 318 is greater than a predetermined value or an allowable value set by a user, the CPU 311 switches on the switch 319 and supplies power to the mobile phone 1 from the battery 318.

The above-mentioned switching operation of the switch 319 by the CPU 311 can be carried out in accordance with a charging request from the mobile phone 1. That is, when there is a charging request from the mobile phone 1 and the remaining charge of the battery 318 is greater than the predetermined value, the CPU 311 switches on the switch 319 to supply power to the mobile phone 1 from the battery 318. On the other hand, when there is no charging request from the mobile phone 1 or the remaining charge of the battery 318 is less than the allowable value, the CPU 311 switches off the switch 319.

In external power supply mode, the computer 2 is actuated by the power supplied externally via the diodes 315 and 316 and the voltage stabilizing circuit 313 and carries out a charging operation for the battery 318 via the battery control circuit 317. Also, in external power supply mode, when there is a charging request from the mobile phone 1, the CPU 311 switches on the switch 319 to supply power to the mobile phone 1 via, in the order of elements closest to the external power supply: the power supply terminal 320, the diode 316, and the switch 319.

Next, the structure of the mobile phone shown in FIG. 1 will be explained. In FIG. 1, a voltage sensor 302 detects a power supply voltage output from the computer 2 and outputs the detection result to a CPU 301 via a control signal bus 304.

A diode 306 prevents the electric current from flowing to the computer 2 from a battery 308. When electric power is not supplied from the computer 2, the input voltage of a voltage sensor 302 decreases to about 0 volts due to the internal resistance of the voltage sensor 302 and the action of the diode 306. On the other hand, when electric power is supplied from the computer 2, the voltage supplied from the computer 2 is detected by the voltage sensor 302.

A battery control circuit 307 charges the battery 308, based on a command from the CPU 301, by using power supplied by the computer 2. The battery control circuit 307 also detects the remaining charge of the battery 308 and outputs the result of the detection to the CPU 301. The remaining charge of the battery 308 may be determined based on the result of the detection of the terminal voltage of the battery 308. Also, the remaining charge of the battery 308 may be detected by the battery control circuit 307 which carries out an operation of multiplying a charging current by a discharging current of the battery 308. A voltage stabilizing circuit 303 stabilizes a power supplied to the CPU 301.

The CPU 301 detects, based on the detection result output from the voltage sensor 302, if power is supplied by the computer 2. The CPU also carries out a charging operation for the battery 308 via the battery control circuit 307 when, based on the detection result output from the battery control circuit 307, the remaining charge of the battery 308 is less than a predetermined value or an allowable value set by a user. Moreover, when the remaining charge of the battery 308 is less than the predetermined amount, the CPU 301 displays an alarm on a display and makes an alarm sound via a speaker to inform the user that the remaining charge of the battery is low.

Figure 2:
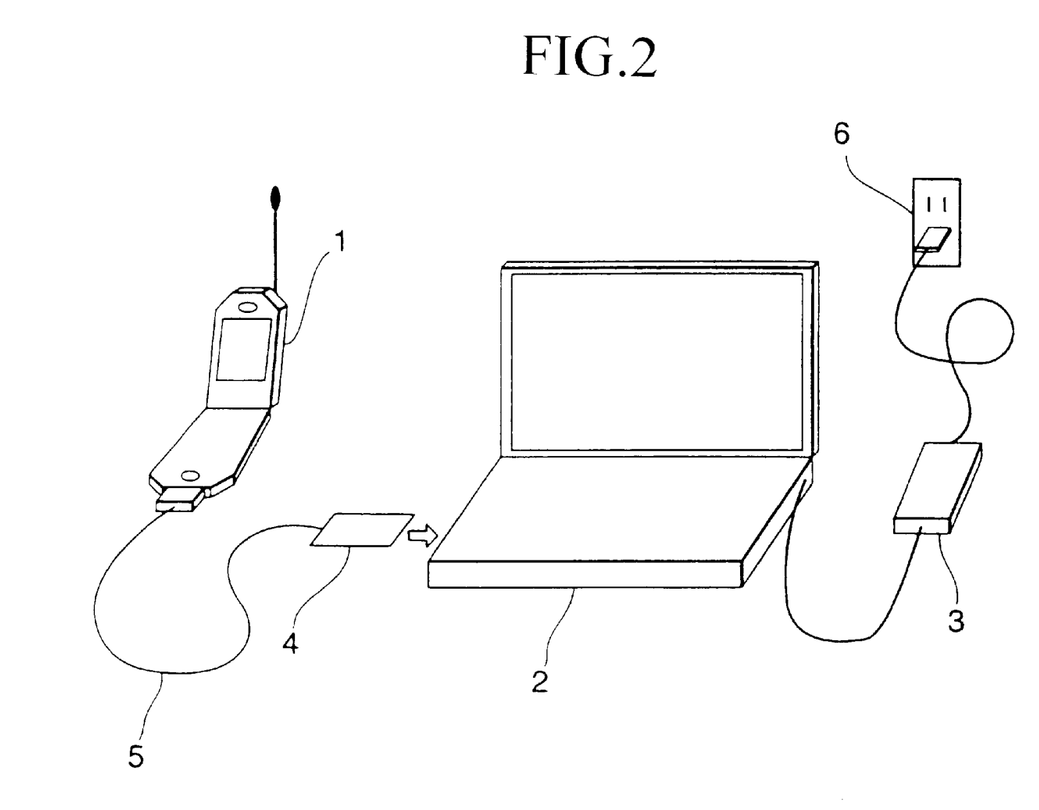
FIG. 2 is a diagram showing an example of a connection state in which a computer 2, to which a power is supplied from an external power source, and a mobile phone 1 are connected to each other.

FIG. 2 is a diagram showing an example of a connection state in which the mobile phone 1 and the computer 2 having the structure shown in FIG. 1 are connected to each other. In FIG. 2, since the computer 2 provides a charging function for the mobile phone as shown in FIG. 1, use of a specially designed charging device, which is equivalent to the charging device 57 for charging the mobile phone 51 shown in FIG. 7, is not necessary. Accordingly, the connection between the charging device and the outlet 56 in FIG. 7 is not required.

The electric power for charging and operating the computer 2 is supplied from an outlet 6 via the DC adapter 3. The charging operation for the mobile phone 1 is carried out by supplying electric power from the computer 2 via an interface card 4 (not shown in FIG. 1), such as a PCMCIA card, and a coupling cable 5. Also, data communication between the mobile phone 1 and the computer 2 and a sending/receiving operation of control signals necessary for the charging operation for the mobile phone 1 are carried out via the interface card 4 and the coupling cable 5.

Figure 3:
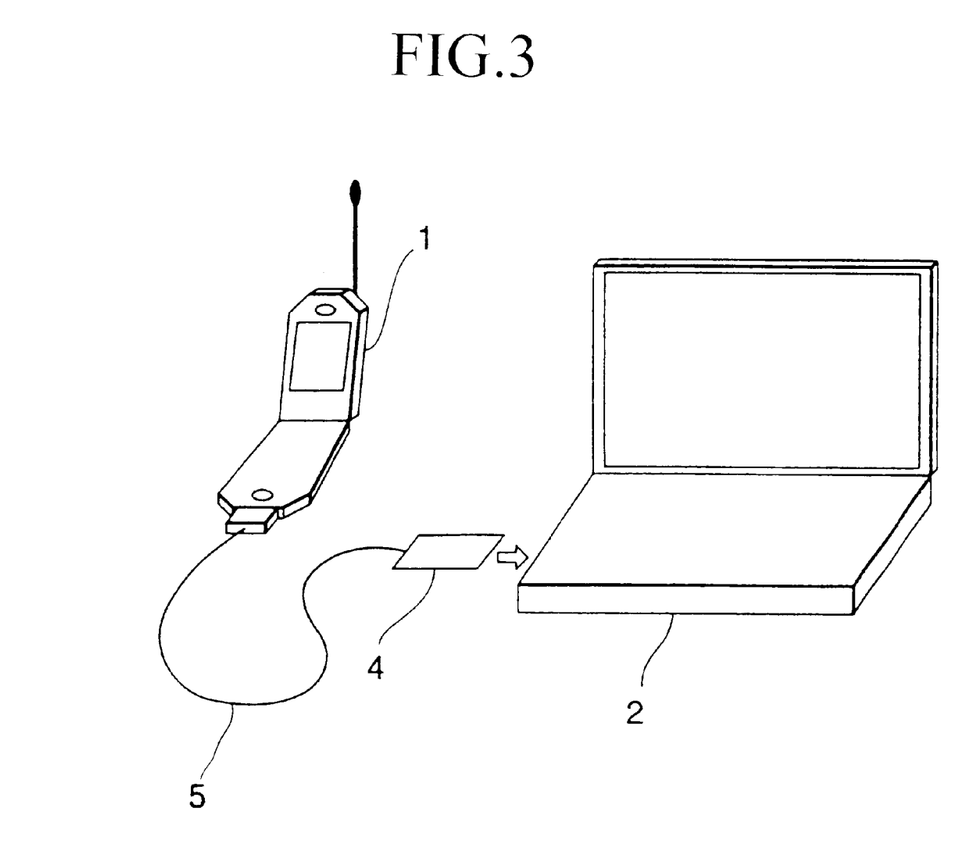
FIG. 3 is a diagram showing a state in which the computer 2 shown in FIG. 2 is powered by internal batteries and connected to the mobile phone 1.

As mentioned above, although FIG. 2 shows the computer 2 in a state where the power is supplied from an external power source, the computer 2 may be used outside where there is no outlet 6 present. In such a situation, the DC adapter 3 is not connected to the outlet 6 as shown in FIG. 3, and the computer 2 is operated by electric power supplied from the internal batteries thereof.

Figure 5:
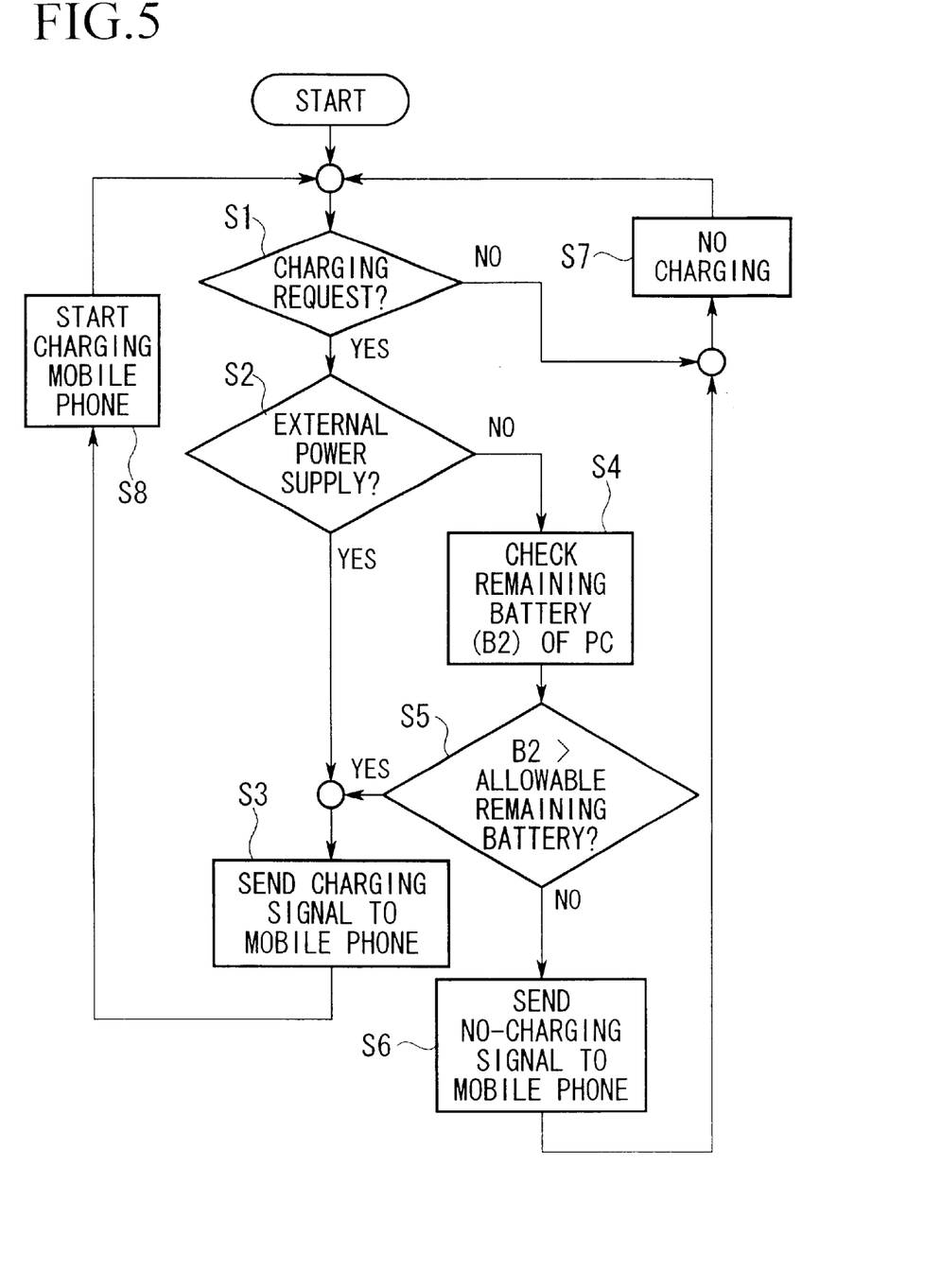
FIG. 5 is a flowchart for explaining the operation of the computer 2 when carrying out a charging operation for the mobile phone 1.
Figure 6:
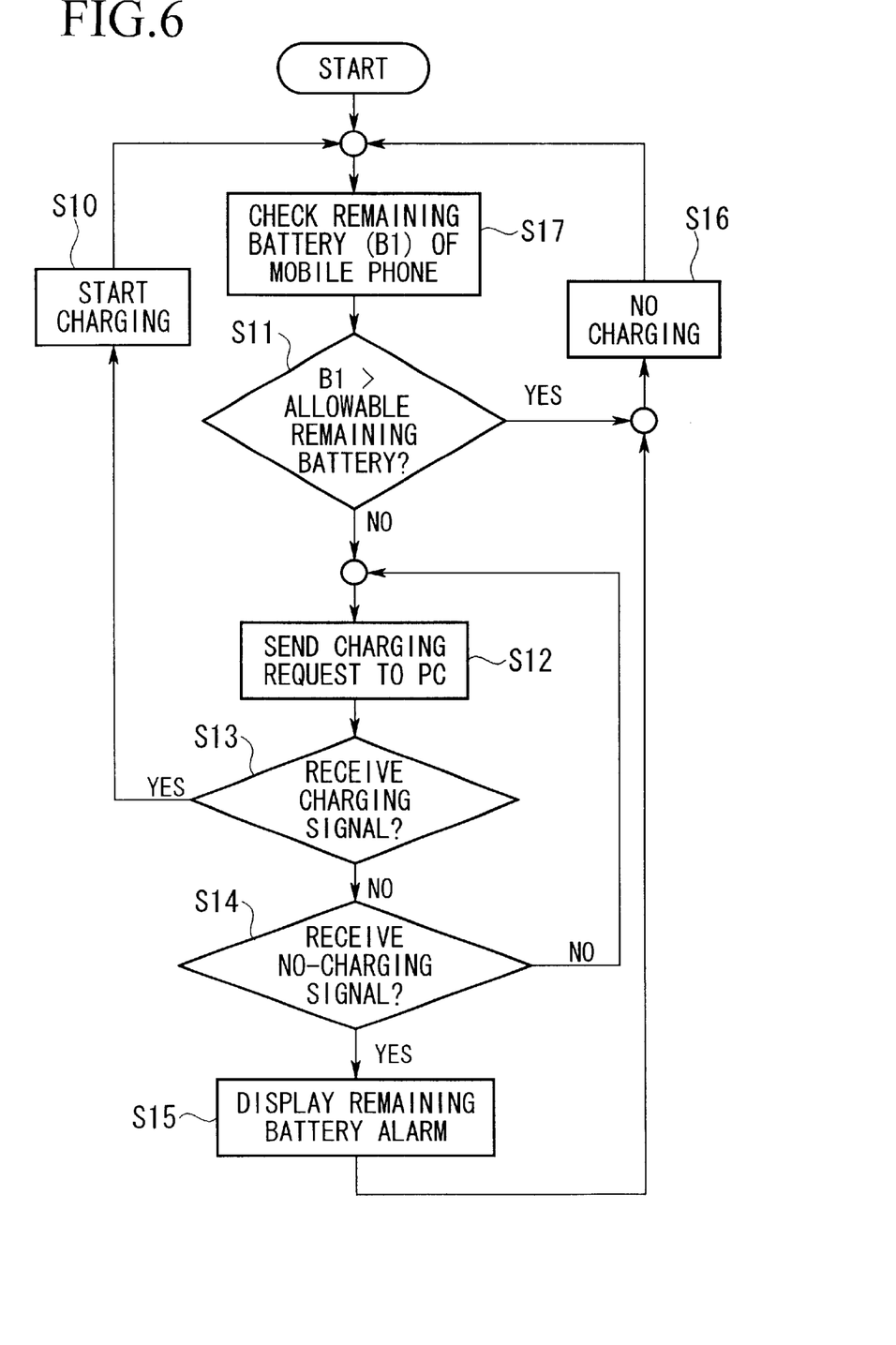
FIG. 6 is a flowchart for explaining a charging operation carried out by the mobile phone 1.

Next, an operation of charging the mobile phone 1 using the power supplied from the computer 2 will be described with reference to the flowcharts shown in FIGS. 5 and 6. FIG. 5 shows a flowchart for explaining the operation of the computer 2 when carrying out a charging operation for the mobile phone 1. FIG. 6 shows a flowchart for explaining a charging operation carried out by the mobile phone 1. In FIG. 5, the switch 319 is initially in its OFF state. When the computer 2 is switched on, the voltage sensor 312 detects the voltage of the power supply terminal 320 and outputs the detection result to the CPU 311. Also, the battery control circuit 317 detects the remaining charge of the battery 318 and outputs the result to the CPU 311. At the same time, the CPU 311 detects if there is a charging request from the mobile phone 1 (step S1). If there is no charging request from the mobile phone 1, the CPU 311 leaves the switch 319 in its OFF state (step S7).

Next, when receiving a charging request from the mobile phone 1, the CPU 311 detects if the computer 2 is operated by electric power supplied from an external power source based on the detection result output from the voltage sensor 312 (step S2). If it is detected that the operation of the computer 2 is being carried out by an external power source (i.e., "YES" in step S2), the CPU 311 sends a charging permit signal to the mobile phone 1 (step S3) and starts the charging operation by switching the switch 319 to its ON state (step S8).

On the other hand, if an external power source is not used (i.e., "NO" in step S2), that is, the computer 2 is operated in battery mode, the CPU 311 detects the remaining charge, B2, of the battery 318 based on the detection result of the battery control circuit 317 (step S4). Then, if the remaining charge of the battery 318 is greater than an allowable value (i.e., "YES" in step S5), the CPU 311 sends a charging permit signal to the mobile phone 1 (step S3), and starts the charging operation by switching the switch 319 to its ON state (step S8).

If the remaining charge of the battery 318 is less than the allowable value (i.e., "NO" in step S5), the CPU 311 sends a charging deny signal to the mobile phone 1 (step S6), and stops the charging operation by switching the switch 319 to its OFF state.

Next, the charging operation for the mobile phone 1 will be explained with reference to FIG. 6. When the computer 2 is switched on, the battery control circuit 307 constantly detects the remaining charge, B1, of the battery 308 (step S10) and outputs the detection result to the CPU 301. Based on the detection result, if the remaining charge of the battery 308 is greater than the predetermined allowable value, the CPU 301 stops sending the charging request signal to the computer 2 and terminates the charging operation (step S16).

On the other hand, if the remaining charge of the battery 308 is less than the predetermined allowable value (i.e., "NO" in step S11), the CPU 301 sends a charging request signal to the computer 2 (step S12). Then, if a charging permit signal is not received from the computer 2 (i.e., "NO" in step S13) and no charging deny signal is received (i.e., "NO" in step S14), the CPU 301 sends a charging request again (step S12).

If a charging permit signal is received (i.e., "YES" in step S13), the CPU 301 starts the charging operation of the battery 308 using the battery control circuit 307 (step S17). On the other hand, if a charging deny signal is received (i.e., "YES" instep S14), the CPU 301 indicates that the remaining charge of the battery is low by means of an alarm display or an alarm sound (step SI 5) and stops sending a charging request (step S16).

Figure 4:
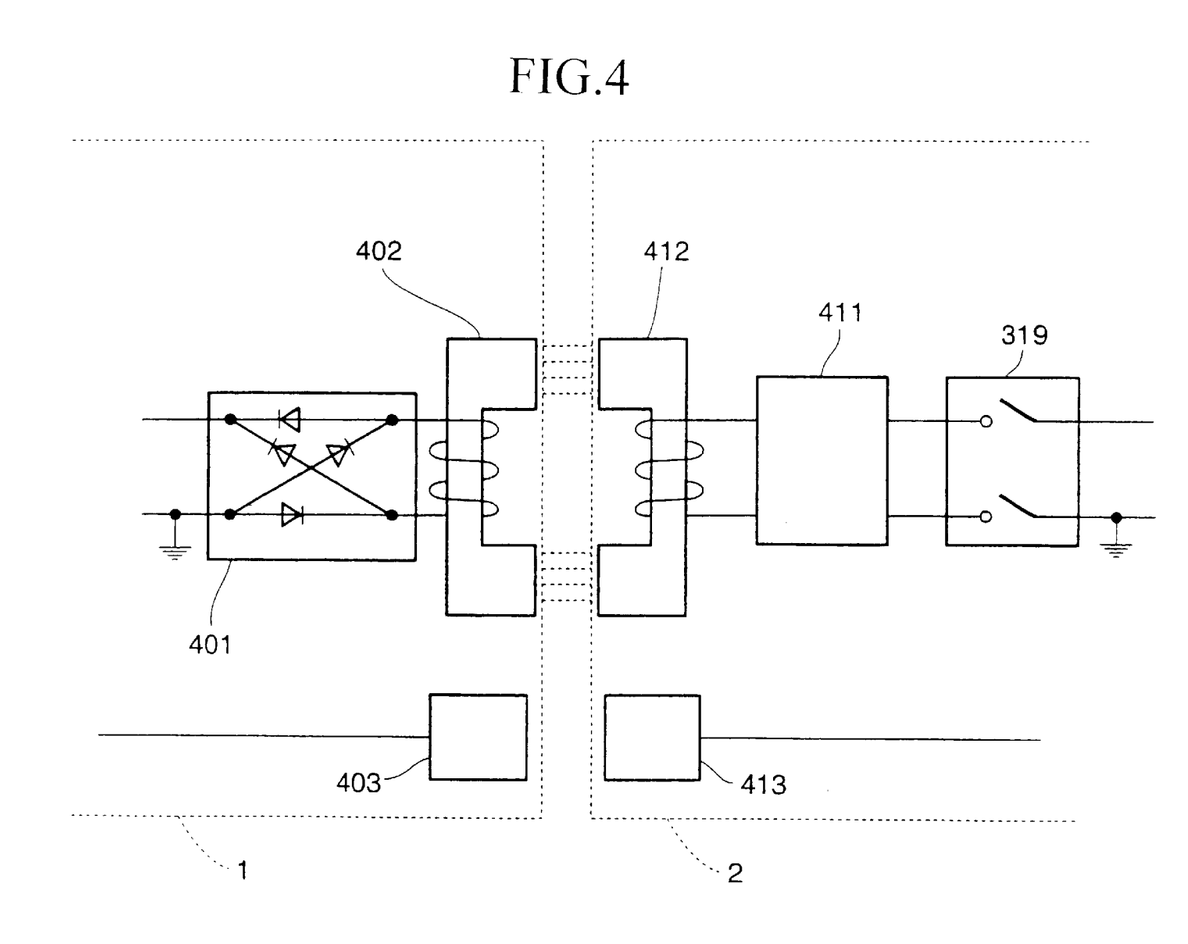
FIG. 4 is a schematic block diagram showing a structure of a non-contact power supply between the computer 2 and the mobile phone 1.

In the above-mentioned embodiment, although the mobile phone 1 and the computer 2 are connected via the coupling cable 5 to supply data and electric power, the coupling cable 5 may be a non-contact type. This will be explained with reference to FIG. 4 as follows. FIG. 4 is a schematic block diagram showing a structure of a non-contact power supply between the computer 2 and the mobile phone 1. In FIG. 4, communication units 403 and 413 include a wireless interface, such as BLUETOOTH (refer to URL: http://www.bluetooth.com/default. asp), and an infrared interface, such as IrDA (refer to URL:http://www.irda. org/), and carry out non-contact transmission of data.

An inverter 411 of the computer 2 converts the direct current power output from the switch 319 into alternating current power and outputs the power to an electromagnetic junction coil 412. On the other hand, another electromagnetic junction coil 402 is provided with the mobile phone 1 at a position opposite the electromagnetic junction coil 412. Each of the electromagnetic junction coils 402 and 412 has a magnetic body core and forms a transformer when they are opposite each other in their proximity and coupled electromagnetically. The ratio of the winding of the electromagnetic junction coils 402 and 412 is set in accordance with the power source voltage of the computer 2 (for instance, 12V) and the power source voltage of the mobile phone 1 (for example 3V). Accordingly, a transfer of electric power is possible even if the difference in voltage between the two power sources is large.

The electric power supplied to the mobile phone 1 is converted into a direct current power by a rectification circuit 401 due to the electromagnetic coupling of the electromagnetic junction coils 402 and 412. Accordingly, the electric power may be supplied to the mobile phone 1 to carry out a charging operation for the battery 308. In this manner, a transfer of data and a charging operation may be carried out without physically connecting the computer 2 with the mobile phone 1.

In the embodiment described above, the case in which a charging operation is carried out by using electric power supplied to the mobile phone from the computer is explained. However, it is possible to interchange the mobile phone with the computer and the computer with the mobile phone. That is, an information terminal device may be represented by a mobile phone and portable equipment may be represented by a computer. It is possible that a computer outputs a charging request to a mobile phone and, based on the charging request, the mobile phone may carry out a charging operation for the computer Moreover, all of the above may be combined and the charging operation may be performed reciprocally when the electric power of either one of the terminal device and the mobile phone is exhausted.

The present invention is characterized by an information terminal device which 10 may be actuated by two kinds of power sources, i.e., internal batteries and an external power source, having a charging function for portable equipment which is simultaneously used with the information terminal device. The information terminal device may be represented by a note book-type portable PC and the portable equipment may be represented by a mobile phone, a digital camera, or a portable information terminal. Accordingly, in this specification, the information terminal device is represented by a note book-type PC (or, simply, a PC) and the portable equipment is represented by a mobile phone. However, it is obvious that the present invention is applicable to a charging operation between an information terminal device and portable equipment in general.

Having thus described several exemplary embodiments of the invention, it will be apparent that various alterations and modifications will readily occur to those skilled in the art. Such alterations and modifications, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A charging system for portable equipment used in a system including an information terminal and portable equipment connected to said information terminal, said portable equipment being operated by using electric power supplied from a battery and data being transmitted between said information terminal and said portable equipment via a communication unit, including:

a power supply output device provided inside said information terminal, said power supply output device being capable of supplying electric power, which is supplied to said information terminal, to said portable equipment; and a first battery control device provided with said portable equipment, said first battery control device receives electric power supplied from said power supply output device and performs a charging operation for the battery of said portable equipment.

2. A charging system for portable equipment used in a system including an information terminal and portable equipment connected to said information terminal, said portable equipment being operated by using electric power supplied from a battery and data being transmitted between said information terminal and said portable equipment via a communication unit, including:

a power supply output device provided with said information terminal, said power supply output device being capable of supplying electric power, which is supplied to said information terminal, to said portable equipment; and a first battery control device provided with said portable equipment, said first battery control device receives electric power supplied from said power supply output device and performs a charging operation for the battery of said portable equipment, wherein
      said first battery control device detects a remaining charge of the battery of said portable equipment; and
      said power supply output device supplies electric power to said portable equipment when the remaining charge of the battery of said portable equipment detected by said first battery control device is equal to or less than a first allowable value.

3. A charging system for portable equipment according to claim 1, further including:

an identification device provided with said information terminal, said identification device identifies whether said information terminal is being operated in battery mode, wherein
said power supply output device supplies electric power to said portable equipment when said identification device identifies that said information terminal is not being operated in battery mode.

4. A charging system for portable equipment according to claim 2, further including:
an identification device provided with said information terminal, said identification device identifies whether said information terminal is being operated in battery mode, wherein
said power supply output device supplies electric power to said portable equipment when said identification device identifies that said information terminal is not being operated in battery mode.

5. A charging system for portable equipment according to claim 3, further including:
a second battery control device provided with said information terminal, said second battery control device detects the remaining charge of a second battery which supplies electric power to said information terminal, wherein
said power supply output device supplies electric power to said portable equipment when said identification device identifies that said information terminal is not being operated in battery mode or the remaining charge of the second battery detected by said second battery control device is greater than a second allowable value, and
said power supply output device stops supplying electric power to said portable equipment when said identification device identifies that said information terminal is being operated in battery mode and the remaining charge of the second battery detected by said second battery control device is equal to or less than a second allowable value.

6. A charging system for portable equipment according to claim 4, further including:
a second battery control device provided with said information terminal, said second battery control device detects the remaining charge of a second battery which supplies electric power to said information terminal, wherein
said power supply output device supplies electric power to said portable equipment when said identification device identifies that said information terminal is not being operated in battery mode or the remaining charge of the second battery detected by said second battery control device is greater than a second allowable value, and
said power supply output device stops supplying electric power to said portable equipment when said identification device identifies that said information terminal is being operated in battery mode and the remaining charge of the second battery detected by said second battery control device is equal to or less than a second allowable value.

7. A charging system for portable equipment according to claim 5, further including:
a display unit which displays a reduction in the remaining charge of the second battery when the remaining charge of the second battery detected by said second battery control device is equal to or less than the second allowable value and no electric power is being supplied from said information terminal.

8. A charging system for portable equipment according to claim 6, further including:
a display unit which displays a reduction in the remaining charge of the second battery when the remaining charge of the second battery detected by said second battery control device is equal to or less than the second allowable value and no electric power is being supplied from said information terminal.

9. A charging system for portable equipment according to claim 5, further including:
an alarm unit which produces an alarm sound when the remaining charge of the second battery detected by said second battery control device is equal to or less than the second allowable value and no electric power is being supplied from said information terminal.

10. A charging system for portable equipment according to claim 6, further including:
an alarm unit which produces an alarm sound when the remaining charge of the second battery detected by said second battery control device is equal to or less than the second allowable value and no electric power is being supplied from said information terminal.

11. A charging system for portable equipment according to claim 7, further including:
an alarm unit which produces an alarm sound when the remaining charge of the second battery detected by said second battery control device is equal to or less than the second allowable value and no electric power is being supplied from said information terminal.

12. A charging system for portable equipment according to claim 8, further including:
an alarm unit which produces an alarm sound when the remaining charge of the second battery detected by said second battery control device is equal to or less than the second allowable value and no electric power is being supplied from said information terminal.

13. A charging system for portable equipment according to claim 1, further including:
a power transmission coil provided with said information terminal, electric power being supplied to said power transmission coil from said information terminal; and
a power receiving coil provided with said portable equipment, said power receiving coil is electromagnetically coupled with said power transmission coil and supplies an induced voltage to said portable equipment, wherein
said communication unit carries out data transmission between said information terminal and said portable equipment by means of radio communication or optical communication.

14. A charging system for portable equipment according to claim 2, further including:
a power transmission coil provided with said information terminal, electric power being supplied to said power transmission coil from said information terminal; and
a power receiving coil provided with said portable equipment, said power receiving coil is electromagnetically coupled with said power transmission coil and supplies an induced voltage to said portable equipment, wherein
said communication unit carries out data transmission between said information terminal and said portable equipment by means of radio communication or optical communication.

15. A charging system for portable equipment according to claim 3, further including:

a power transmission coil provided with said information terminal, electric power being supplied to said power transmission coil from said information terminal; and a power receiving coil provided with said portable equipment, said power receiving coil is electromagnetically coupled with said power transmission coil and supplies an induced voltage to said portable equipment, wherein said communication unit carries out data transmission between said information terminal and said portable equipment by means of radio communication or optical communication.

16. A charging system for portable equipment according to claim 4, further including:

a power transmission coil provided with said information terminal, electric power being supplied to said power transmission coil from said information terminal; and a power receiving coil provided with said portable equipment, said power receiving coil is electromagnetically coupled with said power transmission coil and supplies an induced voltage to said portable equipment, wherein said communication unit carries out data transmission between said information terminal and said portable equipment by means of radio communication or optical communication.

17. A charging system for portable equipment according to claim 5, further including:

a power transmission coil provided with said information terminal, electric power being supplied to said power transmission coil from said information terminal; and a power receiving coil provided with said portable equipment, said power receiving coil is electromagnetically coupled with said power transmission coil and supplies an induced voltage to said portable equipment, wherein said communication unit carries out data transmission between said information terminal and said portable equipment by means of radio communication or optical communication.

18. A charging system for portable equipment according to claim 7, further including:

a power transmission coil provided with said information terminal, electric power being supplied to said power transmission coil from said information terminal; and a power receiving coil provided with said portable equipment, said power receiving coil is electromagnetically coupled with said power transmission coil and supplies an induced voltage to said portable equipment, wherein said communication unit carries out data transmission between said information terminal and said portable equipment by means of radio communication or optical communication.

19. A charging system for portable equipment according to claim 9, further including:

a power transmission coil provided with said information terminal, electric power being supplied to said power transmission coil from said information terminal; and a power receiving coil provided with said portable equipment, said power receiving coil is electromagnetically coupled with said power transmission coil and supplies an induced voltage to said portable equipment, wherein said communication unit carries out data transmission between said information terminal and said portable equipment by means of radio communication or optical communication.

20. A charging system for portable equipment according to claim 11, further including:

a power transmission coil provided with said information terminal, electric power being supplied to said power transmission coil from said information terminal; and a power receiving coil provided with said portable equipment, said power receiving coil is electromagnetically coupled with said power transmission coil and supplies an induced voltage to said portable equipment, wherein said communication unit carries out data transmission between said information terminal and said portable equipment by means of radio communication or optical communication.

* * * * *